United States Patent
Chang

(10) Patent No.: US 7,342,692 B2
(45) Date of Patent: *Mar. 11, 2008

(54) SCANNER CARRIER

(75) Inventor: Wen-Yuan Chang, Hsinchu (TW)

(73) Assignee: Transpacific IP, Ltd., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/203,561

(22) Filed: Aug. 12, 2005

(65) Prior Publication Data

US 2006/0039042 A1    Feb. 23, 2006

Related U.S. Application Data

(63) Continuation of application No. 09/997,853, filed on Nov. 29, 2001, now Pat. No. 6,947,186.

(51) Int. Cl.
*H04N 1/04* (2006.01)
*H01L 27/00* (2006.01)

(52) U.S. Cl. ............ 358/483; 358/482; 358/497; 250/208.1

(58) Field of Classification Search ........ 358/483, 358/482, 497, 494, 471, 474; 250/208.1, 250/234; 382/312

See application file for complete search history.

(56) References Cited

U.S. PATENT DOCUMENTS

| 5,986,774 | A | 11/1999 | Han |
| 6,611,364 | B1 * | 8/2003 | Craig et al. ......... 358/497 |
| 6,732,920 | B2 * | 5/2004 | Gatto et al. ......... 235/381 |

FOREIGN PATENT DOCUMENTS

JP    06-209401    * 7/1994

* cited by examiner

*Primary Examiner*—Houshang Safaipour
(74) *Attorney, Agent, or Firm*—Stolowitz Ford Cowger LLP

(57) ABSTRACT

A carrier device for a contact image sense optical scanner. The carrier device incorporates a pair of magnets with identical poles facing each other or a fluid filled sealed chamber for exerting an equal pressure on a scanning module within the scanner and maintaining close contact with a document platform throughout a scanning operation.

19 Claims, 4 Drawing Sheets

SCANNER CARRIER

This is a Continuation Patent Application of U.S. patent application Ser. No. 09/997,853, filed Nov. 29, 2001 now U.S. Pat. No. 6,947,186, titled, "Scanner Carrier" by Wen-Yuan Chang, assigned to the assignee of the presently claimed subject matter.

BACKGROUND OF THE INVENTION

1. Field of Invention

The present invention relates to a scanner carrier. More particularly, the present invention relates to a carrier structure inside the scanning module of a contact image sensor (CIS) type optical scanner.

2. Description of Related Art

Contact image sensor (CIS) is a type of linear scanner commonly used for scanning an image or a document. The image or document is captured in an electronic format for ease of storage, display, processing and transmission. Due to a modular design, the CIS is easy to assemble, light, compact and costs less to produce.

FIG. 1a is a front view of the scanning module of a conventional contact image sensor and FIG. 1b is a cross-sectional view of the scanning module. As shown in FIGS. 1a and 1b, a conventional contact image sensor (CIS) 100 consists of a linear light source 104, a self-focus lens array 101 and a sensing array 102 over a substrate board 103. The light source 104, the self-focus lens array 101, the sensing array and the substrate board 103 are mounted on an aluminum frame 105. In a scanning operation, the self-focus lens array 101 reflects light coming from the original document and forms an image on the sensing array 102. The sensing array 102 converts a line of color or gray scale light into electronic signals. Throughout the scanning session, the scanning surface 110 of the scanning module 100 in constant contact with a document platform 200 via a buffer plate 300 is pulled forward or backward by an electric motor.

The convention CIS scanning module 100 uses the buffer plate 300 for close contact between the scanning surface 110 and the document platform 200. In general, an external locking mechanism or supporting element is present to ensure a close contact between the scanning module 100 and the document platform 200 during scanning movement However, the locking mechanism or supporting element is a mechanical prop that only provides support in a few fixed locations on the scanning module 100. Hence, close contact everywhere with the document platform cannot be ensued.

SUMMARY OF THE INVENTION

Accordingly, one object of the present invention is to provide a scanner carrier that provides a high-quality scanning operation. The scan carrier utilizes the repulsive forces brought about by the identical pole pieces of a pair of magnet or the pressure produced by liquid or gas to ensure a close contact between the scanning module of a contact image sense scanning module and a document platform.

To achieve these and other advantages and in accordance with the purpose of the invention, as embodied and broadly described herein, the invention provides a carrier device for an optical scanner. The optical scanner at least includes a document platform. The carrier device comprises a base, a contact image sense (CIS) scanning module, a first magnet, a second magnet and a plurality of buffer plates. The base is shaped like an open trough. The first magnet is at the bottom of the open trough. The scanning module enclosed inside the open trough has a scanning surface. The scanning surface heads towards the exterior of the open trough and faces the document platform. The second magnet is attached to the exterior surface at the bottom of the scanning module facing the interior of the open trough. The second magnet has an area roughly equal to the bottom surface of the scanning module. The second magnet and the first magnet are roughly of equal size. Furthermore, the first and the second magnet are arranged to have identical polarity facing each other so that the magnets together set up a repulsive force. Since the second magnet is attached to the exterior surface at the bottom of the scanning module, the scanning module is pressured by a magnetic repulsion with the first magnet. The buffer plates are attached to the inner edge of the scanning surface in contact with the document platform.

The invention also provides a second carrier device for an optical scanner. The optical scanner at least includes a document platform. The carrier device comprises a base, a contact image sense (CIS) scanning module, a seal ring and a plurality of buffer plates. The base is shaped like an open trough. The scanning module has a scanning surface that heads towards the exterior of the open trough and faces the document platform. There is a gap between the four walls of the open trough and the scanning module. The seal ring is inserted into the gap such that the space enclosed by the four sidewalls of the open trough and the exterior surface near the bottom of the scanning module are sealed. The sealed space is filled with a fluid. The buffer plates are attached to the inner edge of the scanning surface in contact with the document platform. The fluid filling the sealed space may be a liquid or a gas.

One major aspect of this invention is the utilization of magnetic repulsion between a pair of identical magnet to press the CIS scanning module tightly against the document platform so that a better scanning quality is obtained.

A second aspect of this invention is the utilization of fluid pressure acting through a sealed chamber to press the CIS scanning module tightly and uniformly against the document platform so that a better scanning quality is obtained.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

FIG. 1b is a cross-sectional view of the scanning module of the contact image sensor shown in FIG. 1a;

DESCRIPTION OF THE PREFERRED EMBODIMENTS

Figure 1A:
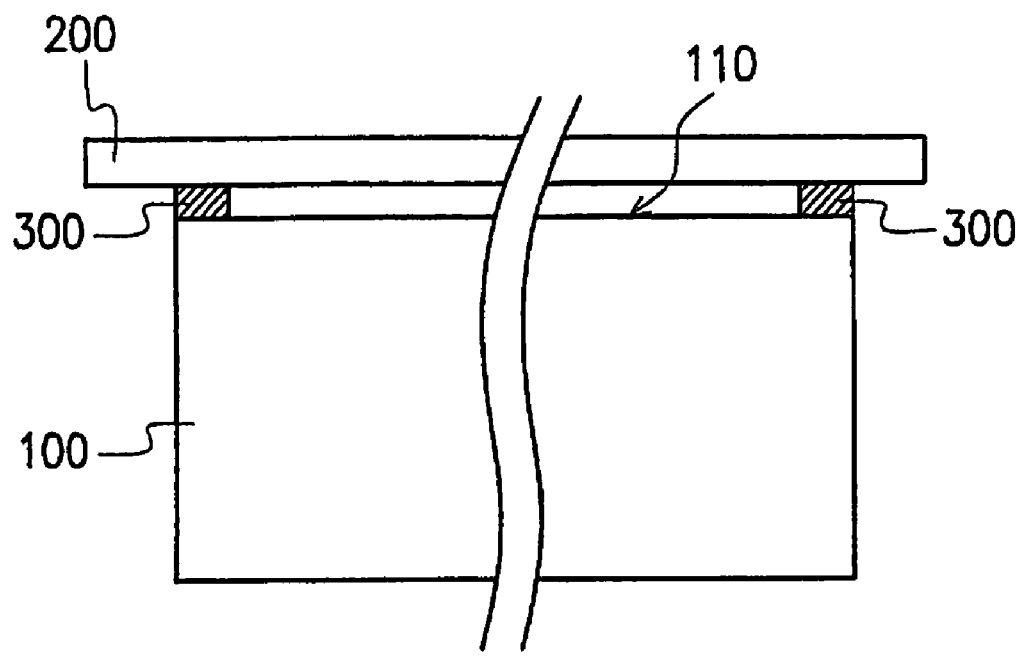
FIG. 1a is a front view of the scanning module of a conventional contact image sensor.
Figure 1B:
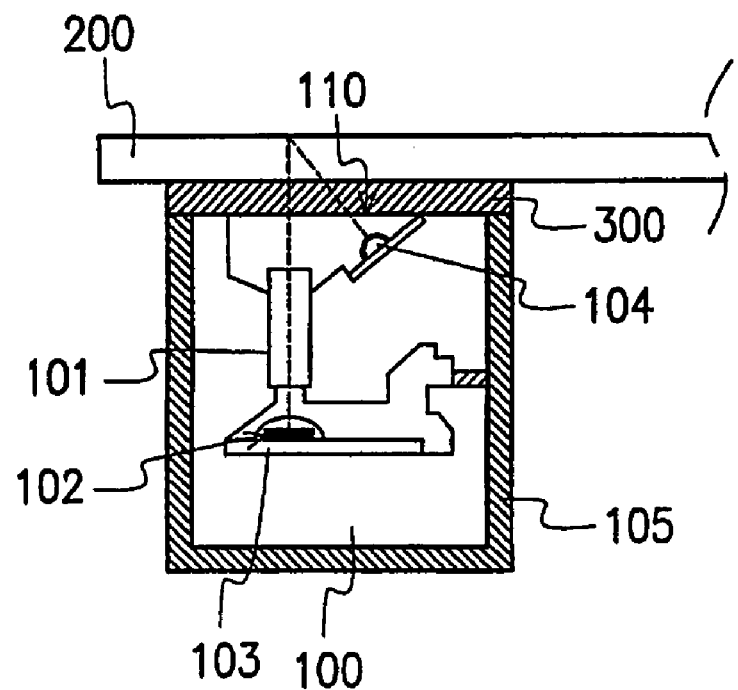

Reference will now be made in detail to the present preferred embodiments of the invention, examples of which are illustrated in the accompanying drawings. Wherever possible, the same reference numbers are used in the drawings and the description to refer to the same or like parts.

Figure 2A:
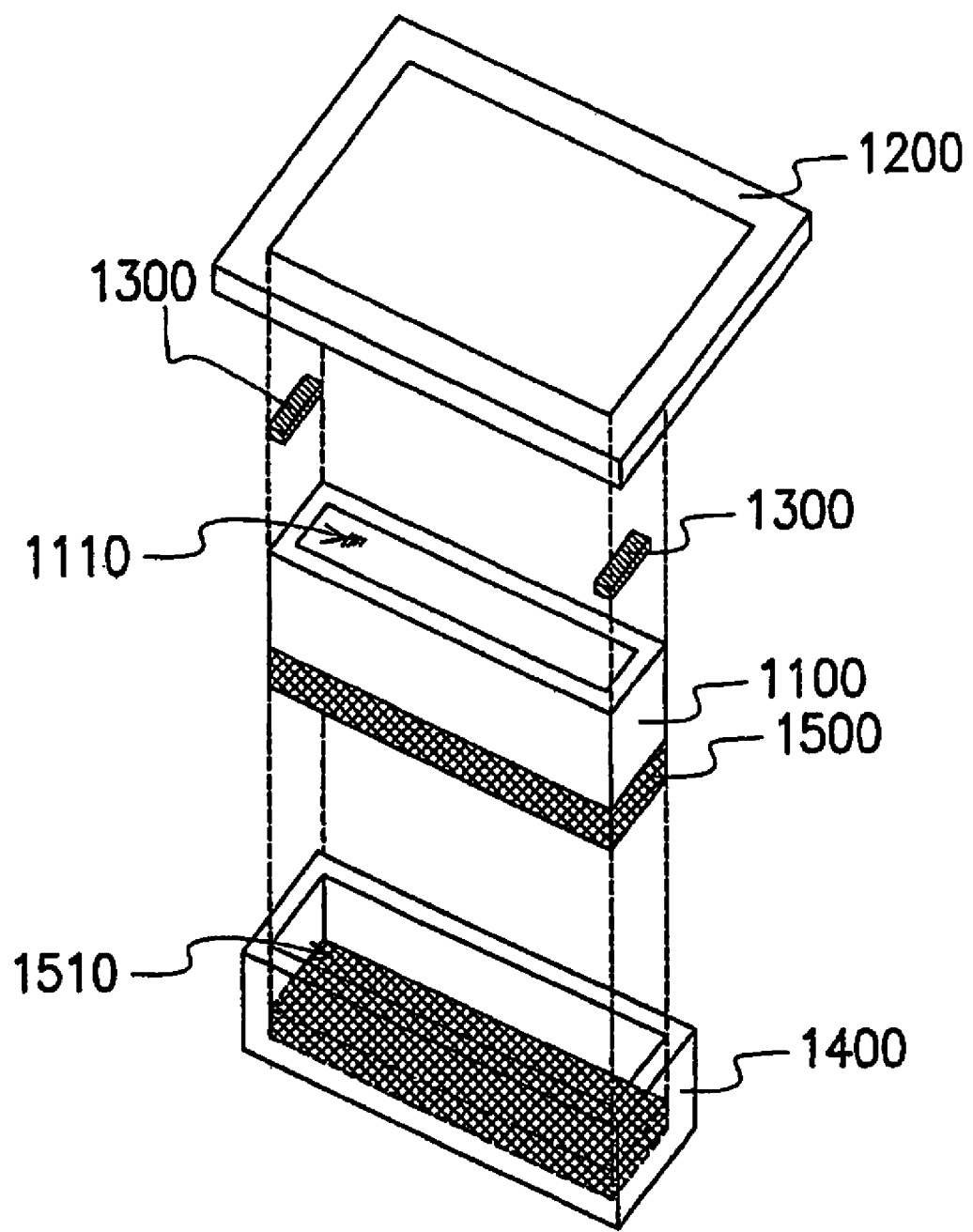
FIG. 2a is a perspective view showing all the components of a carrier device of a CIS scanning module according to a first embodiment of this invention.
Figure 2B:
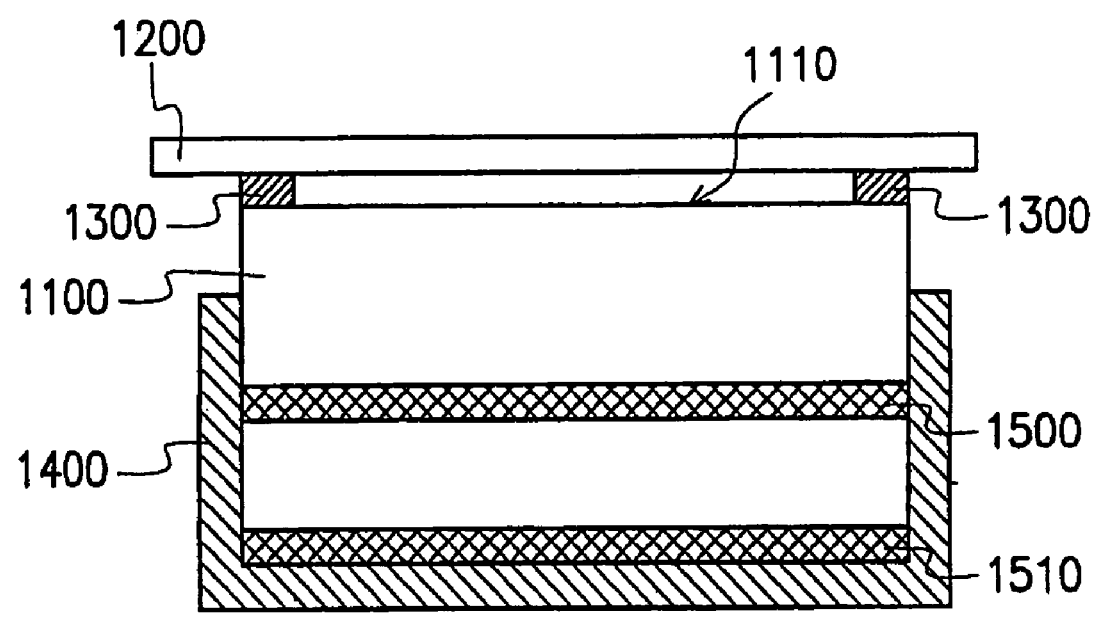
FIG. 2b is a cross-sectional view of the assembled carried device of the CIS scanning module according to the first embodiment of this invention.

FIG. 2a is a perspective view showing all the components of a carrier device of a CIS scanning module according to a first embodiment of this invention. FIG. 2b is a cross-sectional view of the assembled carried device of the CIS scanning module according to the first embodiment of this invention. As shown in FIGS. 2a and 2b, the carrier device of the CIS scanning module includes a carrier base 1400, a first magnet 1510, a CIS scanning module 1100 and a plurality of buffer plates 1300. The carrier base 1400 has an open trough shape. The first magnet 1510 is attached to the interior surface at the bottom of the carrier base 1400. The second magnet 1500 is attached to the exterior surface at the bottom of the CIS scanning module 1100 facing the first magnet 1510. The polarity of the first and the second magnet are arranged to have identical pole types and are facing each other. Hence, the repulsive force caused by the repulsion between the first and the second magnet pushes the scanning module 1100 up. The trough opening of the base carrier 1400 is only slightly greater than the external dimension of the scanning module 1100 so that movement of the scanning module 1100 is limited to vertical up/down motion. The buffer plates 1300 are attached to the interior edge of the scanning surface 1110 above the CIS scanning module 1100. Through the buffer plates 1300, the CIS scanning module 1100 is pressed tightly against a document platform 1200.

Since the repulsive forces resulting from the magnetic repulsion act uniformly across the bottom surface of the scanning module 1100, the CIS scanning module 1100 is able to press against the document platform tightly.

Figure 3:
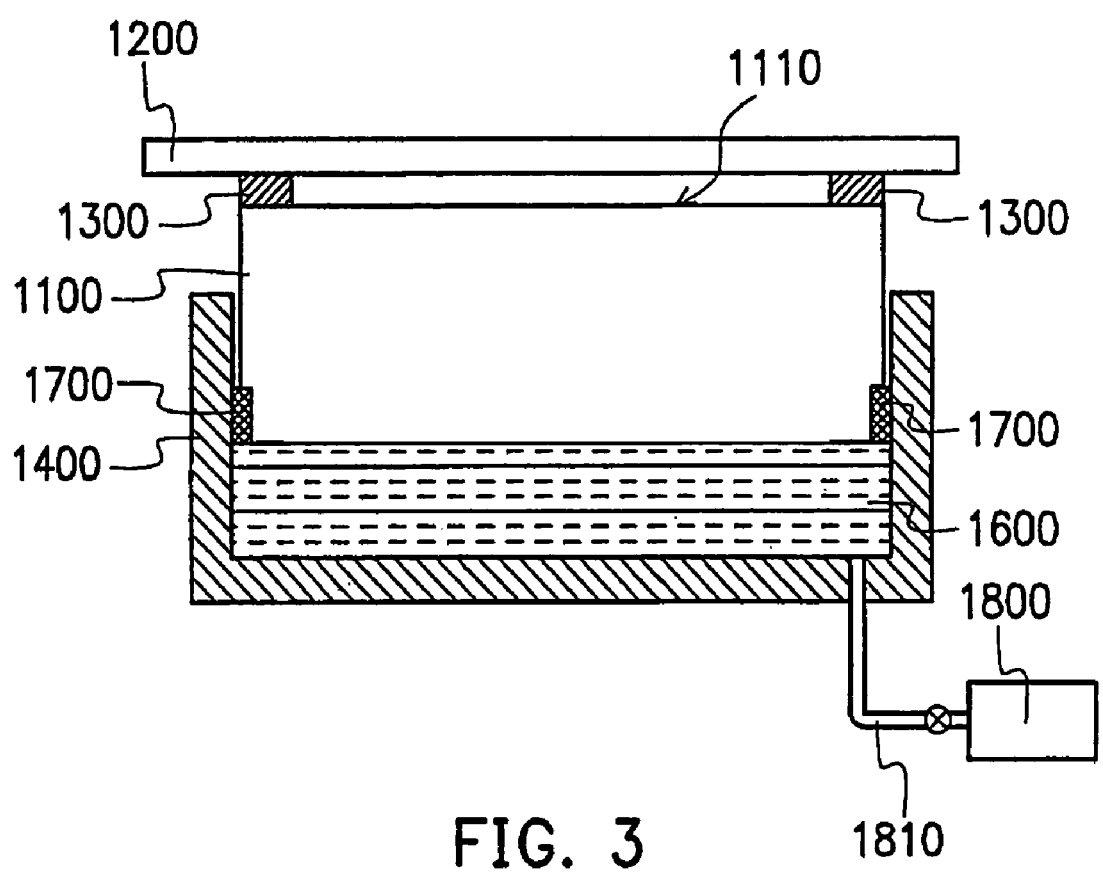
FIG. 3 is a cross-sectional view of an assembled carrier device of a CIS scanning module according to a second embodiment of this invention.

FIG. 3 is a cross-sectional view of an assembled carrier device of a CIS scanning module according to a second embodiment of this invention. As shown in FIG. 3, the contact image sense (CIS) scanning module 1100 is enclosed within the trough interior of a carrier base 1400. A seal ring 1700 encloses the space between the four vertical sidewalls of the scanning module 1100 and the four interior sidewalls of the carrier base 1400, thereby forming a sealed chamber. A fluid 1600 is injected to fill the sealed chamber. The fluid 1600 can be a liquid or a pressurized gas, for example. Weight of the scanning module 1100 is supported by fluid pressure inside the sealed chamber. Through a pipeline 1810, the sealed chamber within the base carrier 1400 is connected to a pump 1800 so that the pump 1800 is able to regulate fluid pressure within the sealed chamber. The buffer plates 1300 are attached to the interior edge of a scanning surface 1110 above the CIS scanning module 1100. Through the buffer plates 1300, the CIS scanning module 1100 is pressed tightly against a document platform 1200.

Since the fluid 1600 is able to provide exert equal pressure on the bottom surface of the CIS scanning module 1100, the scanning module 1100 is able to press against the document platform tightly.

In conclusion, major advantages of this invention include:

1. Magnetic repulsion between a pair of identical magnets is utilized to provide the necessary pressure for pressing the CIS scanning module tightly against the document platform and obtain a better scanning quality.

2. Alternatively, fluid pressure acting through a sealed chamber is utilized to provide the necessary pressure for pressing the CIS scanning module tightly against the document platform and obtain a better scanning quality.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A component, comprising:
a carrier device for an optical scanner, wherein the carrier device comprises a base capable of receiving at least a portion of a scanning module, wherein the base has a substantially trough-like shape including an open end and an inside surface substantially opposing the open end, wherein the base includes a first magnet coupled to at least a portion of the inside surface, and wherein the scanning module includes a second magnet disposed thereon to enable a repelling magnetic force between the first and second magnets when the first and second magnets are placed in close proximity.

2. The component of claim 1, wherein the carrier device is further capable of allowing a scanning module to move up and/or down relative to the base when the base receives the scanning module.

3. An optical scanner, comprising:
a base comprising a substantially trough-like shape including an open end and an inside surface substantially opposing the open end, wherein the base includes a first magnet coupled to at least a portion of the inside surface; and
a scanning module at least partially inserted in to the open end of the base, wherein the scanning module includes a second magnet disposed thereon, to enable a repelling magnetic force between the magnets in response to insertion of the scanning module into the open end of the base.

4. The optical scanner of claim 3, wherein the base is further capable of allowing the scanning module to move towards and/or away from the base in response to the receipt of the scanning module at said base.

5. The optical scanner of claim 3, wherein the optical scanner comprises a contact image sense (CIS) scanning device.

6. The optical scanner of claim 3, wherein the apparatus further comprises a document platform coupled to the scanning module, wherein the repelling magnetic force enables pressure of the document platform against the scanning module.

7. An apparatus, comprising:
a carrier base including an opening and a first magnet;
a scanning module including a second magnet, the scanning module configured to be inserted in the opening of the carrier base; and
a document platform overlying the scanning module, wherein the first magnet in the carrier base is positioned to repel the scanning module and press the scanning module against the document platform.

8. The apparatus of claim 7, wherein the scanning module further includes a second magnet, the second magnet arranged to be repulsed by the first magnet.

9. The apparatus of claim 8, wherein the first magnet is disposed on an inside surface of the carrier base opposite the opening and the second magnet is disposed on a bottom surface of the scanning module to face the first magnet when the scanning module is inserted into the opening of the carrier base.

10. The apparatus of claim 7, wherein the scanning module and the opening of the carrier base have substantially identical cross-sectional dimensions to restrict movement of the scanning module in the opening to a single direction.

11. The apparatus of claim 10, wherein the scanning module and the document platform comprise at least a portion of an optical scanner, and wherein the optical scanner comprises a contact image sense (CIS) scanning device.

12. An optical scanner, comprising:
a base comprising a substantially trough-like shape including an open end;
a scanning module at least partially inserted into the open end of the base; and
a chamber formed substantially between the base and the scanning module, wherein the chamber is substantially sealed, and at least partially filled with one or more fluids.

13. The optical scanner of claim 12, wherein the fluid comprises at least a gas.

14. The optical scanner of claim 12, wherein the fluid comprises at least a liquid.

15. The optical scanner of claim 12, wherein the chamber is configured so that the one or more fluids exert pressure on the base and/or the scanning module.

16. The optical scanner of claim 15, further comprising a pump configured to regulate the exerted pressure by regulating the one or more fluids at least partially filling the chamber.

17. The optical scanner of claim 12, wherein the base is further configured to allow the scanning module to move towards and/or away from the base.

18. The optical scanner of claim 12, wherein the optical scanner comprises a contact image sense (CIS) scanning device.

19. The optical scanner of claim 15, wherein the apparatus further comprises a document platform coupled to the scanning module, wherein the exerted pressure results in the document platform being pressed against the scanning module.

* * * * *